(12) United States Patent
Hamada et al.

(10) Patent No.: US 11,551,842 B2
(45) Date of Patent: Jan. 10, 2023

(54) SUPERCONDUCTING MAGNET APPARATUS

(71) Applicants: JAPAN SUPERCONDUCTOR TECHNOLOGY INC., Hyogo (JP); RIKEN, Saitama (JP)

(72) Inventors: Mamoru Hamada, Kobe (JP); Yoshinori Yanagisawa, Wako (JP); Yu Suetomi, Wako (JP)

(73) Assignees: JAPAN SUPERCONDUCTOR TECHNOLOGY INC., Hyogo (JP); RIKEN, Saitama (JP)

( * ) Notice: Subject to any disclaimer, the term of this patent is extended or adjusted under 35 U.S.C. 154(b) by 233 days.

(21) Appl. No.: 15/931,498

(22) Filed: May 13, 2020

(65) Prior Publication Data

US 2020/0365303 A1 Nov. 19, 2020

(30) Foreign Application Priority Data

May 14, 2019 (JP) .............................. JP2019-091256

(51) Int. Cl.
*H01F 6/06* (2006.01)
*H01F 27/28* (2006.01)

(52) U.S. Cl.
CPC ........... *H01F 6/06* (2013.01); *H01F 27/2823* (2013.01)

(58) Field of Classification Search
CPC .............................. H01H 6/06; H01F 27/2823
USPC ....................................................... 335/216
See application file for complete search history.

(56) References Cited

U.S. PATENT DOCUMENTS

| 5,298,679 | A  | * | 3/1994 | Wu ........................ | H01F 6/04 505/887 |
| 7,924,126 | B2 | * | 4/2011 | Hait ....................... | H01F 6/02 505/879 |
| 2012/0094840 | A1 | * | 4/2012 | Tanaka .................... | H01F 6/04 505/211 |
| 2015/0177271 | A1 | * | 6/2015 | Kim ........................ | H02K 7/09 310/90.5 |

FOREIGN PATENT DOCUMENTS

JP          2018-098420 A     6/2018

* cited by examiner

*Primary Examiner* — Alexander Talpalatski
(74) *Attorney, Agent, or Firm* — Studebaker & Brackett PC (57) ABSTRACT

To provide a superconducting magnet apparatus with a structure which can prevent an increase in apparatus size even when a number of connection portions serving to connect superconducting wires is great. The superconducting magnet apparatus includes a first wiring-holding portion (tubular body (12)) extending from a bobbin (6) in an axial direction of a superconducting coil (1) and a second wiring-holding portion (joint plate (13)) which is provided on a same side in the axial direction as the tubular body (12), extends in a direction intersecting with the axial direction, and has a greater diameter than that of the bobbin (6) and the tubular body (12). Superconducting wires (7a to 11a) which extend from the superconducting coil (1) and connect to one another are spirally wound on the tubular body (12) and fastened to a groove (13a) formed on the joint plate (13).

9 Claims, 8 Drawing Sheets

SUPERCONDUCTING MAGNET APPARATUS

TECHNICAL FIELD

The present invention relates to a superconducting magnet apparatus.

BACKGROUND ART

Patent Document 1 discloses a technology relating to a superconducting magnet apparatus. The technology disclosed in Patent Document 1 relates to a connection structure of superconducting wires to be included in the superconducting magnet apparatus which is configured as follows. The superconducting magnet apparatus includes a grooved frame with a groove portion, and a connection portion serving to connect two superconducting wires is fastened to the groove portion. Furthermore, the grooved frame may have a cylindrical portion; in this case, the two superconducting wires are wound on the cylindrical portion.

According to Patent Document 1, the above configuration is reportedly capable of effectively reducing damage to the connection portion through protection of the connection portion from bending, impact, and/or other external forces. Furthermore, protection of extra length parts of the superconducting wires from bending and/or folding in a certain direction is reportedly enabled when the configuration in which the grooved frame has the cylindrical portion is adopted to enable the superconducting wires to be held by being wound on the cylindrical portion.

PRIOR ART DOCUMENTS

Patent Documents

Patent Document 1: Japanese Unexamined Patent Application Publication No. 2018-98420

SUMMARY OF THE INVENTION

Problems to be Solved by the Invention

Recently, the development of superconducting magnet apparatuses capable of generating super-high magnetic fields has been advancing. A coil is increased in size to generate super-high magnetic fields, which requires a very long superconducting wire. Meanwhile, the length of each superconducting wire is limited. Therefore, a plurality of superconducting wires need to be connected to one another to obtain one very long superconducting wire, which increases the number of connection portions serving to connect the superconducting wires.

Accordingly, in the above conventional technology, a connector is formed by attaching one grooved frame, to which the connection portion serving to connect the two superconducting wires is fastened, to a plate called a "cold plate," and a plurality of the connectors, to each of which one of the connection portions is fastened, are arranged such that the connectors are slightly separated from one another in an axial direction of the superconducting coil.

In the above configuration, when the number of the connection portions serving to connect the superconducting wires is increased, many of the connectors are also needed, which may result in a shortage of arrangement space for the connectors. A forcible expansion of the arrangement space leads to an increase in the size of the superconducting magnet apparatus.

The present invention has been made in view of the above circumstances, and an object of the present invention is to provide a superconducting magnet apparatus having a structure which can prevent an increase in apparatus size even when the number of connection portions serving to connect superconducting wires is great.

The present invention is a superconducting magnet apparatus including a superconducting coil; a first wiring-holding portion which extends from a bobbin of the superconducting coil in an axial direction of the superconducting coil; and a second wiring-holding portion provided on a same side in the axial direction as the first wiring-holding portion, wherein the second wiring-holding portion extends in a direction intersecting with the axial direction and has a diameter greater than that of the bobbin and the first wiring-holding portion. Superconducting wires which extend from the superconducting coil and connect to one another are spirally wound on the first wiring-holding portion and are fastened to a groove formed on the second wiring-holding portion.

According to the present invention, a plurality of connection portions serving to connect the superconducting wires can be aggregated in the second wiring-holding portion. Accordingly, an increase in apparatus size can be prevented even when the number of the connection portions serving to connect the superconducting wires is great.

DESCRIPTION OF THE EMBODIMENTS

Hereinafter, embodiments for carrying out the present invention will be described with reference to the drawings.

Figure 1:
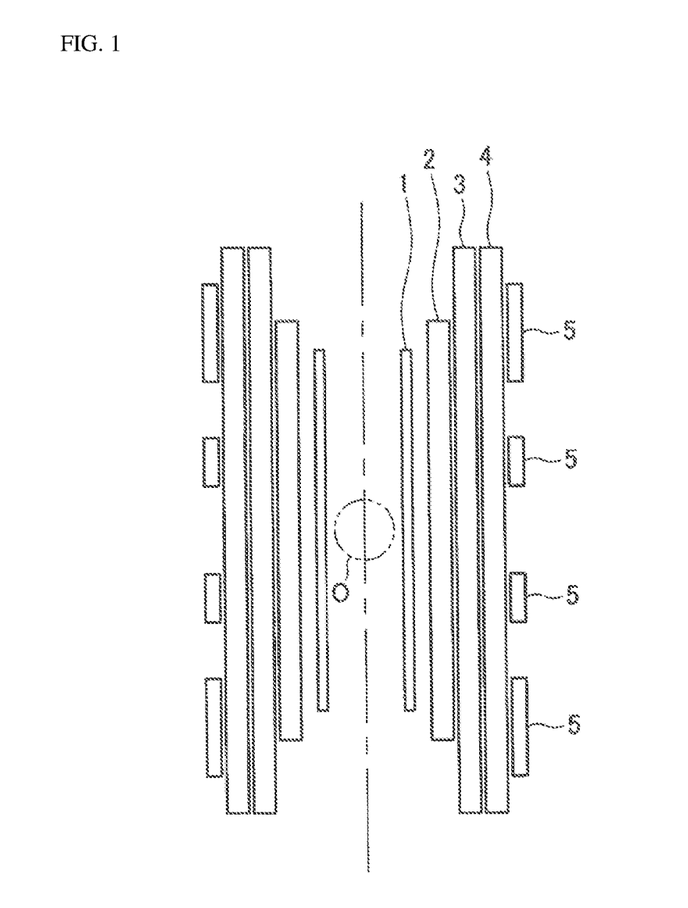
FIG. 1 is a cross-sectional view of a plurality of superconducting coils constituting a superconducting magnet apparatus according to an embodiment of the present invention.

FIGS. 1 to 5 illustrate a superconducting magnet apparatus according to an embodiment of the present invention. As illustrated in FIG. 1, the superconducting magnet apparatus includes a first superconducting coil 1, a second superconducting coil 2, a third superconducting coil 3, a fourth superconducting coil 4, and a plurality of fifth superconducting coils 5 arranged along an axial direction, in this order from an inner side. The plurality of the fifth superconducting coils 5 are correction coils for correcting generated magnetic fields. The superconducting coils 1 to 5 are stored in a cryogenic container (not illustrated) called a cryostat and are cooled by liquid helium or the like.

Figure 4:
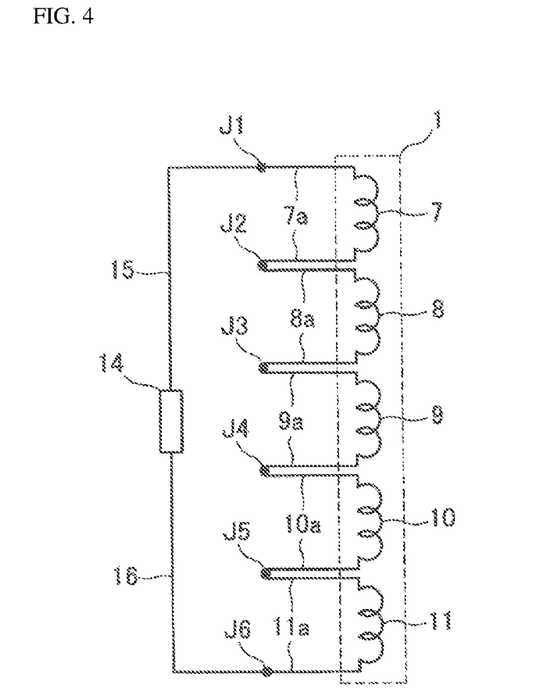
FIG. 4 is a circuit diagram illustrating a persistent-current loop portion of the innermost superconducting coil of the plurality of the superconducting coils illustrated in FIG. 1.
Figure 5:
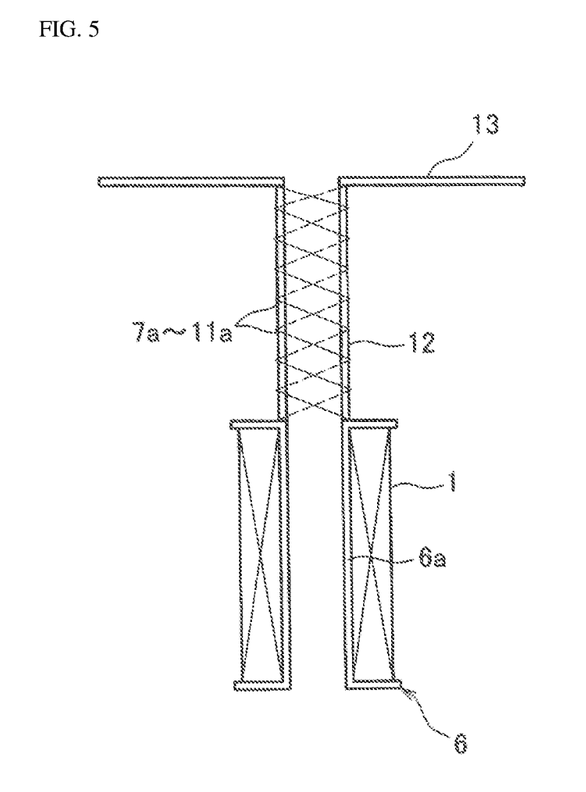
FIG. 5 is a schematic view of FIG. 2 (illustration of a persistent-current switch has been omitted).

A superconducting wire constituting the first superconducting coil 1 is a tape-shaped wire such as, for example, a Y-based superconducting wire, the Y-based superconducting wire being an example of a high-temperature superconducting wire. In the first superconducting coil 1, the superconducting wire is wound on a body 6a of a bobbin 6 as illustrated in FIG. 5; as illustrated in FIG. 4, the first superconducting coil 1 includes a plurality of supercoonducting wires 7 to 11, which are connected. Furthermore, the superconducting wires 7 and 11, respectively being on each end of the plurality of the superconducting wires 7 to 11, are connected to superconducting wires 15 and 16, respectively, the superconducting wires 15 and 16 extending from a persistent-current switch 14. The superconducting wires 15 and 16 are also Y-based superconducting wires, for example. Reference symbols J1 to J6 are used for respective connection portions serving to connect the superconducting wires 7 to 11, 15, and 16.

As a method for connecting the superconducting wires 7 to 11, 15, and 16, which are Y-based superconducting wires or the like, to one another at a low resistance of less than or equal to $10^{-11}\Omega$, a method exists in which the superconducting wires are connected to one another by heat treatment such as sintering. The heat treatment for connecting the superconducting wires to one another requires, for example, a temperature of approximately 800° C.; therefore, two superconducting wires to be connected need to be led into a heating furnace. In this case, since the first superconducting coil 1 cannot be inserted into the heating furnace as a whole, lead lines 7a to 11a from the first superconducting coil 1 (i.e., superconducting wires which extend from the superconducting coil) are inserted into the heating furnace, and portions to be connected are connected by heat treatment. Furthermore, if required performance is not obtained after the superconducting wires are connected by heat treatment to one another, a connection portion is cut and portions in a vicinity thereof are connected by heat treatment again, or the portions in the vicinity of the connection portion are connected by heat treatment again without cutting thereof. Therefore, with regard to connecting the superconducting wires 7 to 11, 15, and 16 to each other at a low resistance, in light of enabling redoing, the superconducting wires 7 to 11, 15, and 16 need to have sufficient extra length.

Figure 2:
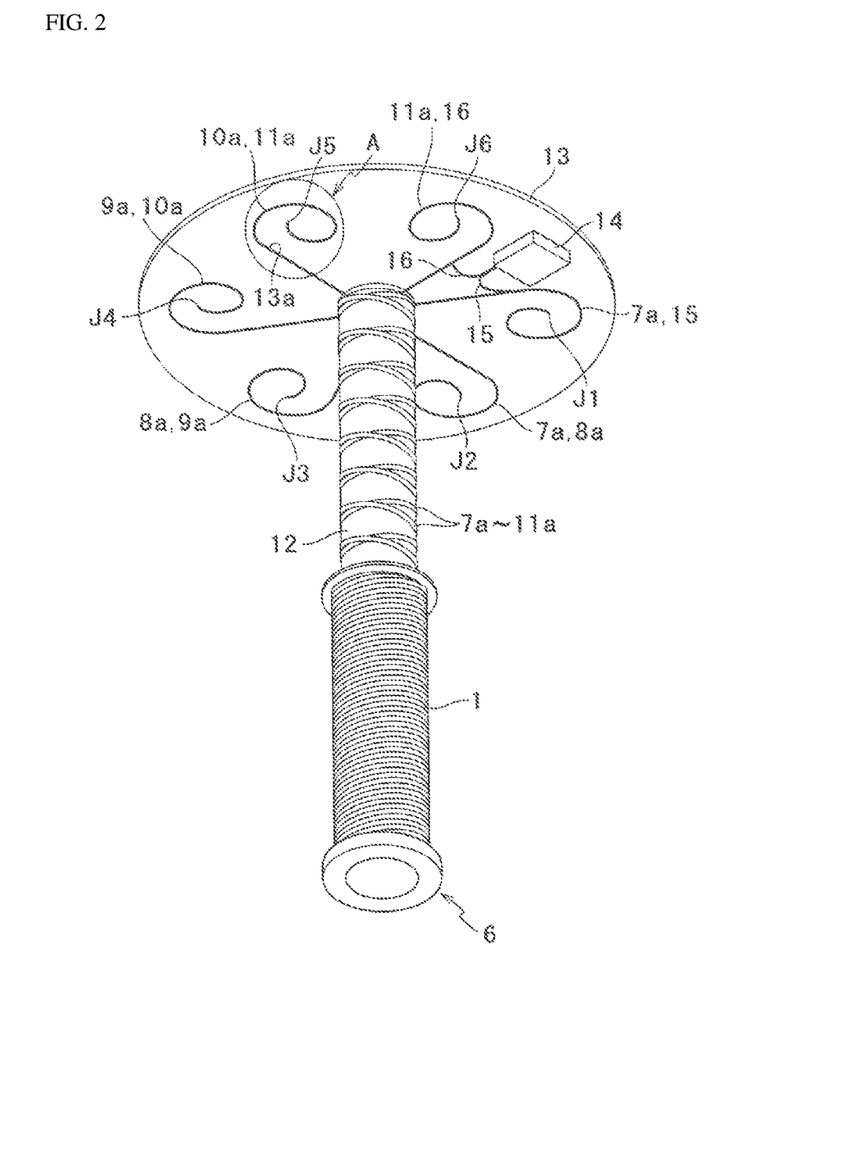
FIG. 2 is a perspective view of a part of the superconducting magnet apparatus according to an embodiment of the present invention, which illustrates a structure for holding superconducting wires (lead wires) which extend from an innermost superconducting coil of the plurality of the superconducting coils illustrated in FIG. 1.

As illustrated specifically in FIG. 2 and schematically in FIG. 5, which show partial structures of the superconducting magnet apparatus, the superconducting magnet apparatus includes a tubular body 12 as a first wiring-holding portion which extends from the bobbin 6 in the axial direction of the first superconducting coil 1. A joint plate 13 serving as a second wiring-holding portion is coupled to an end of the tubular body 12 the end being opposite to the bobbin 6. The joint plate 13, which is disk-shaped, has a diameter greater than that of the bobbin 6 and the tubular body 12, and extends from the tubular body 12 in a direction intersecting with the axial direction of the first superconducting coil 1. In this embodiment, the joint plate 13 is, but is not necessarily required to be, orthogonal to the tubular body 12. In addition, the bobbin 6 and the tubular body 12 may be separate parts coupled together or may be a single unit formed of one material.

The tubular body 12 and the joint plate 13 are cooled by a refrigerant such as liquid helium or the like so that the lead lines 7a to 11a (superconducting wires) and the superconducting wires 15 and 16 can maintain a superconducting state.

Figure 3:
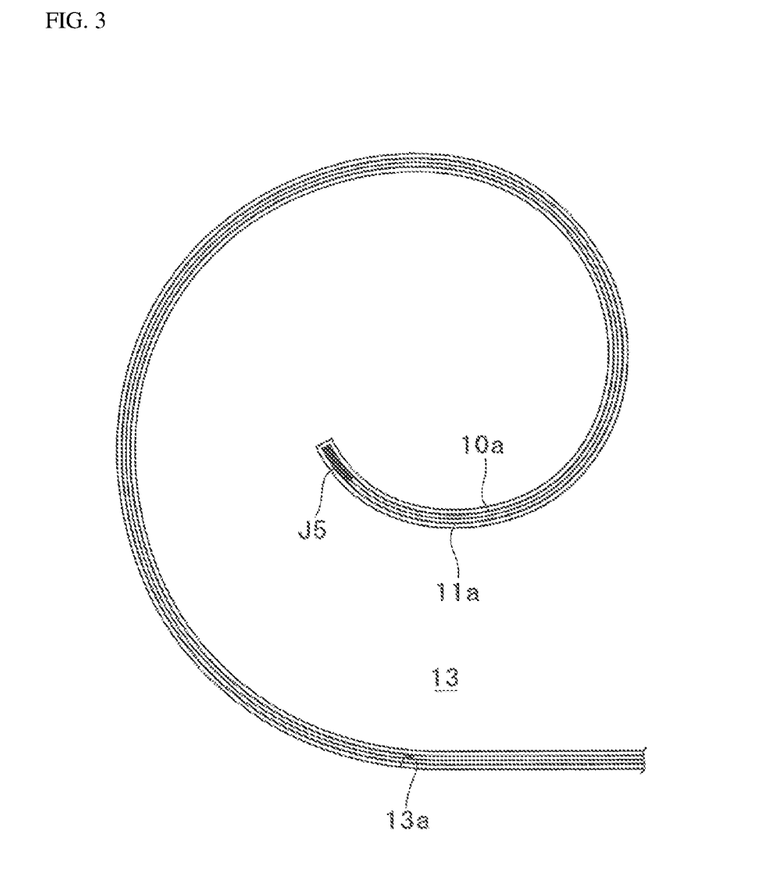
FIG. 3 is an enlarged plan view of Portion A in FIG. 2.

FIG. 3 is an enlarged plan view of portion A in FIG. 2. As illustrated in FIG. 3, a spiral-shaped groove 13a for storing the lead lines 10a and 11a from the first superconducting coil 1 and the connection portion J5 therebetween is formed on a bottom surface of the joint plate 13. The groove 13a does not necessarily need to have a spiral shape as in this embodiment and may have a straight-line shape, an S-shape, or a circular arc shape. It is to be noted that FIG. 3 represents the structure for storing the lead lines and the connection portion therebetween; grooves similar to the groove 13a are also formed on the bottom surface of the joint plate 13 to store the other lead lines 7a to 9a, the superconducting wires 15 and 16 which extend from the persistent-current switch 14, and the connection portions J1 to J4 and J6 therebetween.

The lead lines 7a to 11a from the first superconducting coil 1 (i.e., the superconducting wires which extend from the superconducting coil) are connected and stored by the following procedure.

From the bobbin 6 to a level of the bottom surface of the joint plate 13, the lead lines 7a to 11a are spirally wound on an outer peripheral surface of the tubular body 12. Then, extra length parts of the lead lines 7a to 11a, and the superconducting wires 15 and 16 which extend from the persistent-current switch 14, specifically one end of the lead line 7a and one end of the lead line 8a, the other end of the lead line 7a and one end of the superconducting wire 15, and so on, are inserted into the heating furnace as appropriate and connected by heat treatment. Then, the characteristics of the connection portions J1 to J6 obtained by the heat treatment are evaluated. If the required performance is not obtained, the connection by heat treatment is repeated until the required performance is obtained. In a case of repeating the connection by heat treatment, the connection portion may be cut and portions in the vicinity thereof may be connected by heat treatment again, or the portions in the vicinity of the connection portion may be connected by heat treatment again without cutting thereof.

When the characteristics of the connection portions J1 to J6 obtained by the connection by heat treatment are satisfactory, the two superconducting wires, having been connected by heat treatment, are superposed on one another in a spiral shape and stored in a corresponding groove (for example, the groove 13a) formed on the bottom surface of the joint plate 13.

Subsequently, the lead lines 7a to 11a spirally wound on the outer peripheral surface of the tubular body 12 are fastened to the tubular body 12 with an adhesive agent, a putty, a tape, a wax, a clay, or the like. In a similar manner, the lead lines 7a to 11a and the superconducting wires 15 and 16 stored in the respective grooves on the joint plate 13 are fastened to the joint plate 13 with an adhesive agent, a putty, a tape, a wax, a clay, or the like. In this manner, the extra length parts of the superconducting wires can be fastened with certainty to the tubular body 12 and the joint plate 13.

According to the above configuration, the plurality of the connection portions J1 to J6 serving to connect the superconducting wires 7 to 11, 15, and 16 can be gathered on the joint plate 13. Consequently, an increase in apparatus size can be prevented even when a number of the connection portions serving to connect the superconducting wires is great.

Furthermore, in the above embodiment, an outer diameter of the tubular body 12 serving as the first wiring-holding portion is equal to an outer diameter of the body 6a of the bobbin 6. According to this configuration, curvatures of the lead lines 7a to 11a spirally wound on the tubular body 12 are small, as compared with a case in which the outer diameter of the tubular body 12 is smaller than the outer diameter of the body 6a of the bobbin 6; thus, breakage of the lead lines 7a to 11a can be prevented. In view of this, it is to be noted that the outer diameter of the tubular body 12 is preferably greater than or equal to the outer diameter of the body 6a of the bobbin 6.

Here, since the lead lines 7a to 11a are superconducting wires, magnetic fields due to energization which cannot be overlooked may be generated around the tubular body 12, on which the lead lines 7a to 11a are spirally wound, and the joint plate 13, which has a spiral shape. Hence, it is preferred that an influence of the magnetic fields on a magnet center O (see FIG. 1) is calculated in advance, and a manner in which the fifth superconducting coils 5 serving as the correction coils are wound is determined in such a way as to minimize the influence.

The superconducting magnet apparatus of the above embodiment includes one joint plate 13 as the second wiring-holding portion. In contrast, FIG. 6 illustrates an embodiment in which a plurality of joint plates are provided as the second wiring-holding portion, corresponding to FIG. 5.

When the number of the connection portions serving to connect the superconducting wires for one superconducting coil such as, for example, the first superconducting coil 1 is great, a plurality of joint plates may be provided for the one superconducting coil. This configuration, in which a greater number of joint plates capable of aggregating the plurality of the connection portions serving to connect the superconducting wires is provided, can further prevent an increase in apparatus size.

Figure 6:
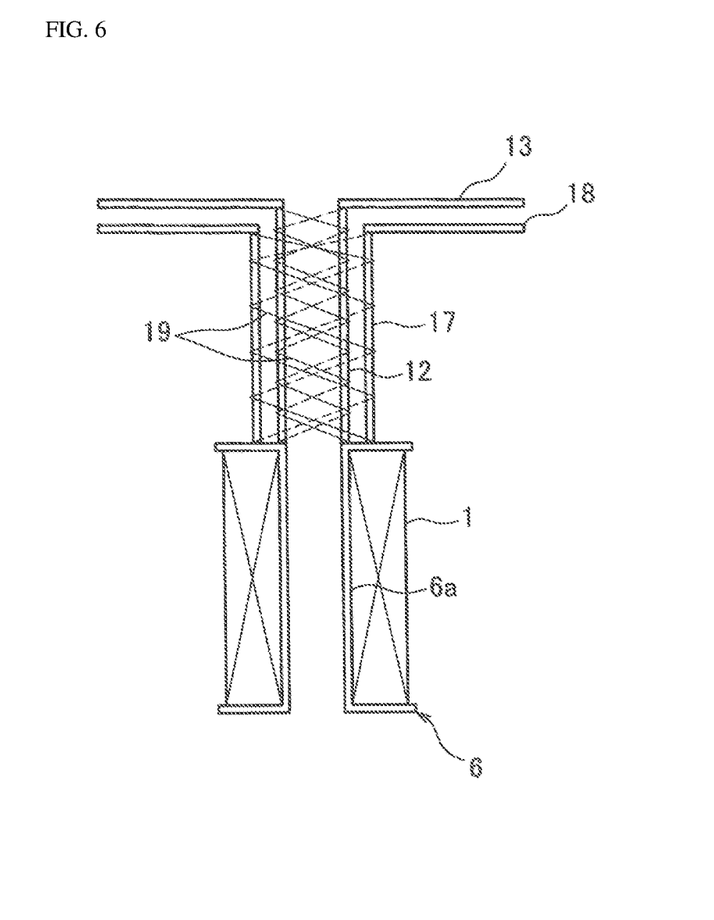
FIG. 6 is a view corresponding to FIG. 5 when a plurality of second wiring-holding portions are provided.

In the embodiment illustrated in FIG. 6, a plurality of joint plates 13 and 18 are arranged such that the joint plates are separated from each other in the axial direction of the first superconducting coil 1. The superconducting magnet apparatus further includes, in addition to the tubular body 12, a tubular body 17 as the first wiring-holding portion which extends from the bobbin 6 in the axial direction of the first superconducting coil 1. The joint plate 18 serving as the second wiring-holding portion is coupled to an end of the tubular body 17.

A plurality of lead lines 19 from the first superconducting coil 1 (i.e., a plurality of superconducting wires 19 which extend from the superconducting coil) are spirally wound on the tubular body 12 and the tubular body 17 and are fastened to the joint plate 13 and the joint plate 18 in a coiled shape.

Figure 7:
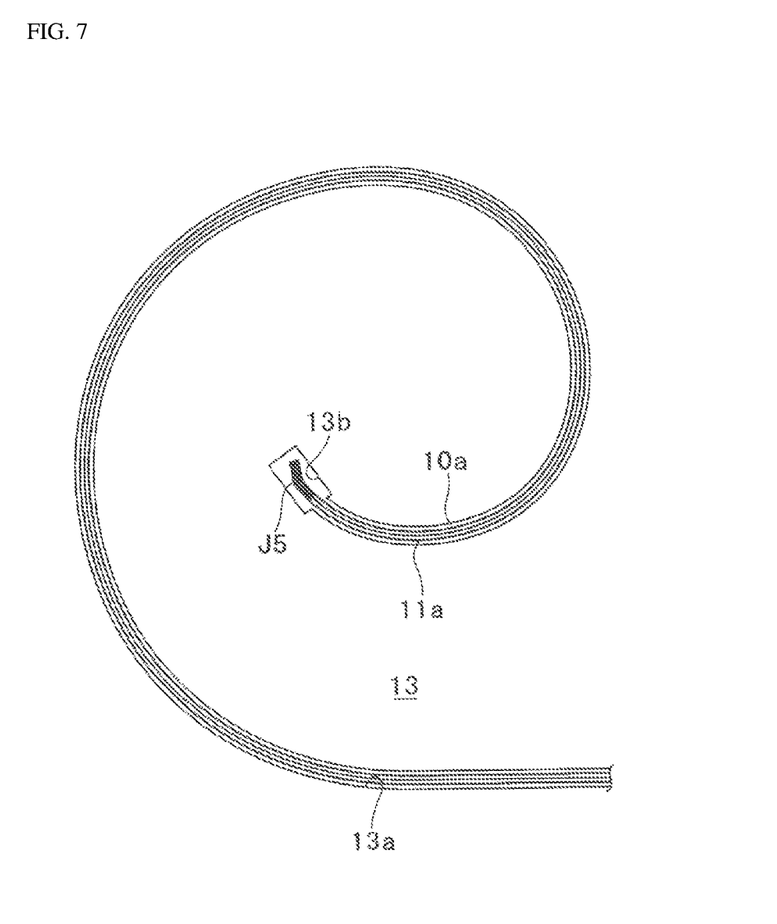
FIG. 7 is a view corresponding to FIG. 3 and illustrating a modified example of a storage portion for a connection portion serving to connect the superconducting wires, the storage portion being formed in the second wiring-holding portion.
Figure 8:
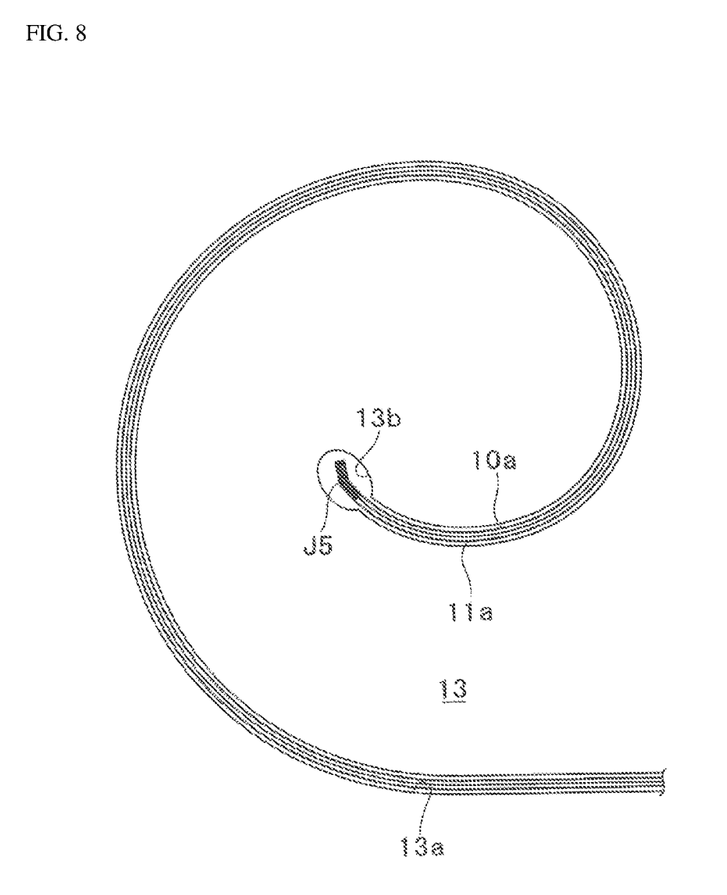
FIG. 8 is a view corresponding to FIG. 3 and illustrating a modified example of the storage portion for the connection portion serving to connect the superconducting wires, the storage portion being formed in the second wiring-holding portion.

FIGS. 7 and 8 correspond to FIG. 3, and illustrate modified examples of a storage portion for the connection portion J5 serving to connect the superconducting wires (lead lines 10a and 11a) formed on the joint plate 13 as the second wiring-holding portion.

As illustrated in FIGS. 7 and 8, the connection portion J5 serving to connect the superconducting wires may have a curved shape instead of a shape in which the two superconducting wires are simply superposed on one another (arranged alongside one another). In this case, there is a concern that a groove like the groove 13a having such a width that only the two superconducting wires which are simply superposed on one another (arranged closely side by side) can be accommodated may not enable storing the connection portion J5, which is curved.

Therefore, in the modified example illustrated in FIG. 7, a terminal portion of the groove 13a, which stores the connection portion J5, is a storage groove 13b which is wider than the groove 13a and is rectangular in plan view. This configuration improves a capacity of the joint plate 13 to store the connection portion J5 serving to connect the superconducting wires.

Furthermore, in the modified example illustrated in FIG. 8, the terminal portion of the groove 13a is a storage groove 13c which is wider than the groove 13a and is elliptical in plan view. As in the modified example illustrated in FIG. 7, this configuration improves the capacity of the joint plate 13 to store the connection portion J5 serving to connect the superconducting wires.

The above embodiments can be modified as follows. The shape of the superconducting wire does not need to be a tape shape and may be a cylindrical shape or the like. Furthermore, as the superconducting wire, a low-temperature superconducting wire may be used instead of a high-temperature superconducting wire.

The connection portions J1 to J6 serving to connect the superconducting wires do not necessarily need to be at ends of the superconducting wires; the superconducting wires may be connected at positions slightly separated from the ends.

In the example shown in the above embodiment, the plurality of the superconducting wires (lead lines) which extend from the first superconducting coil 1, being in an innermost layer, are fastened to the joint plate 13 in a coiled shape via the tubular body 12, the tubular body 12 extending from the bobbin 6. Similar to the case of the first superconducting coil 1, not only the plurality of the superconducting wires (lead lines) which extend from the superconducting coil being in the innermost layer, but also those which extend from a superconducting coil not being in the innermost layer, i.e., the second superconducting coil 2 and/or the third superconducting coil 3, may be fastened to a joint plate (second wiring-holding portion) in a coiled shape via a tubular body (first wiring-holding portion) which extends from the corresponding bobbin. Moreover, with regard to only the superconducting coils not being in the innermost layer, the plurality of the superconducting wires (lead lines) which extend from the superconducting coil may be fastened to the joint plate (second wiring-holding portion) in a coiled shape via the tubular body (first wiring-holding portion) extending from the bobbin.

In the embodiment illustrated in FIG. 6, the joint plate 18 is coupled to the tubular body 17 coupled to the bobbin 6. Without providing the tubular body 17, the plurality of the lead lines 19 may all be wound on the tubular body 12 on an inner side. In this case, for example, the joint plate 18 is coupled to the joint plate 13 by a fastening device such as a bolt or the like.

In the modified examples of the storage portion for the connection portion serving to connect the superconducting wires illustrated in FIGS. 7 and 8, the terminal portion of the groove 13a, which accommodates the connection portion, is rectangular or elliptical and is wider than the groove 13a. It is only necessary that the storage portion for the connection portion, which is formed on the joint plate as the second wiring-holding portion, is wider than the groove 13a, which stores the two superconducting wires except for the connection portion, and the shape of the storage portion is not limited to a rectangular shape or an elliptical shape.

For example, in the superconducting magnet apparatus illustrated in FIGS. 1 to 5, instead of using high-temperature superconducting wires as all of the superconducting wires 7 to 11 (including the lead lines 7a to 11a) and the superconducting wires 15 and 16, high-temperature superconducting wires and NbTi wires (low-temperature superconducting wires) may be used as the superconducting wires 7 to 11 (including the lead lines 7a to 11a) and the superconducting wires 15 and 16, respectively. In this case, the persistent-current switch 14 is provided at a site different from the joint plate 13 (at an appropriate position outside the joint plate 13).

It is to be noted that "the persistent-current switch 14 is provided at a site different from the joint plate 13" means that the persistent-current switch 14 is attached to a member of the superconducting magnet apparatus which is different from the joint plate 13 and enables the persistent-current switch 14 to be cooled so that the superconducting wires which extend from the persistent-current switch 14 can maintain a superconducting state.

It is to be noted that the first superconducting coil 1 illustrated in FIG. 2 is preferably wound on the bobbin 6 by a layer winding method such as intra-layer no-insulation or the like to lead the superconducting wires from the first superconducting coil 1 to the tubular body 12. The "intra-layer no-insulation" as referred to herein means a winding method in which a metal sheet being insulated on a single side thereof is inserted, or an insulating sheet and a metal sheet are inserted between layers of a coil with non-insulated superconducting wires, thereby causing electrical contact between the superconducting wires in the layers to increase thermal stability of the coil.

The embodiments and the modified examples of the present invention have been described above. It is to be noted that various modifications can be further made within a range which can be conceived by those skilled in the art.

EXPLANATION OF THE REFERENCE SYMBOLS

1 First superconducting coil
2 Second superconducting coil
3 Third superconducting coil
4 Fourth superconducting coil
5 Fifth superconducting coil (correction coil)
6 Bobbin
6a Body
7-11, 15, 16 Superconducting wire
7a-11a, 19 Superconducting lead wire
12, 17 Tubular body (first wiring-holding portion)
13, 18 Joint plate (second wiring-holding portion)

The invention claimed is:

1. A superconducting magnet apparatus comprising:
a bobbin around which superconducting wires are wound to constitute a superconducting coil;
a tubular first wiring-holding portion arranged adjacently to the bobbin on one side of an axial direction of the bobbin; and
a plate-shaped second wiring-holding portion connected to the first wiring-holding portion on the one side in the axial direction at a geometric center of the plate-shaped second wiring-holding portion,
wherein
a plurality of lead lines, being the superconducting wires having been drawn from the bobbin, are wound on the first wiring-holding portion, extend to the second wiring-holding portion, and are fastened to grooves formed on the second wiring-holding portion, with ends thereof being connected,
the second wiring-holding portion comprises a plurality of connection portions at which the lead lines are connected, and
in a direction orthogonal to the axial direction, an outer diameter of the second wiring-holding portion is greater than an outer diameter of the first wiring-holding portion.

2. The superconducting magnet apparatus according to claim 1, wherein a plurality of the second wiring-holding portions are arranged in the axial direction.

3. The superconducting magnet apparatus according to claim 1, wherein an outer diameter of the first wiring-holding portion is greater than or equal to an outer diameter of a body of the bobbin.

4. The superconducting magnet apparatus according to claim 1, wherein the superconducting wires are tape-shaped wires.

5. The superconducting magnet apparatus according to claim 1, wherein the superconducting wires are fastened to the second wiring-holding portion in a coiled shape or a linear shape or a curved shape.

6. The superconducting magnet apparatus according to claim 1, wherein the superconducting wires are fastened to the first wiring-holding portion and the second wiring-holding portion with an adhesive agent, a putty, a tape, a wax, or a clay.

7. The superconducting magnet apparatus according to claim 1, further comprising a persistent-current switch, wherein the persistent-current switch is arranged at a site different from the second wiring-holding portion.

8. The superconducting magnet apparatus according to claim 1, wherein the superconducting coils are wound by intra-layer no-insulation.

9. The superconducting magnet apparatus according to claim 1, wherein the plurality of connection portions are formed on the second wiring-holding portion.

* * * * *